Dec. 24, 1968   C. E. EDMAN ETAL   3,417,981
CONTROL SYSTEM FOR A FLAME CUTTING MACHINE
Filed April 7, 1966   4 Sheets-Sheet 1
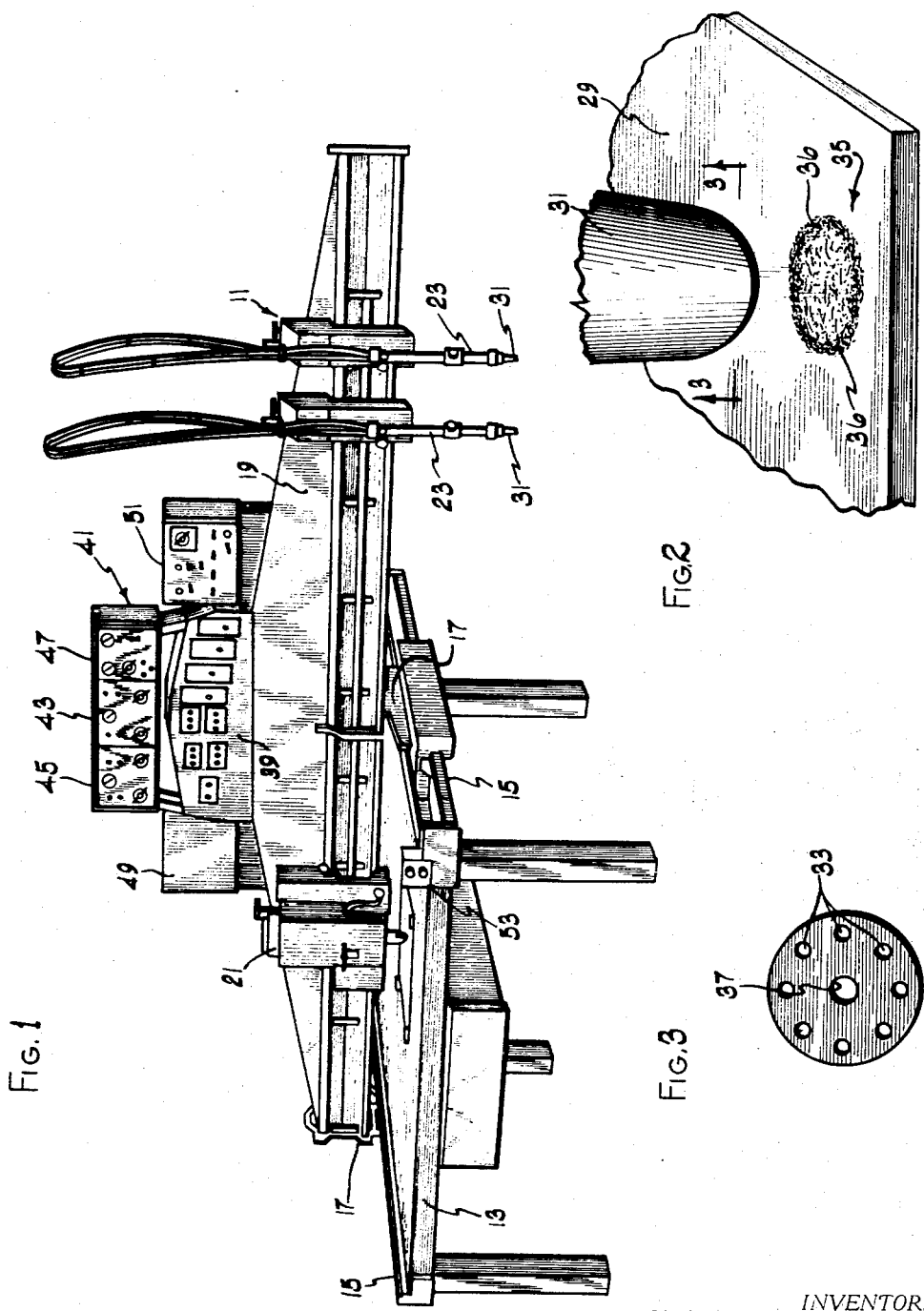
INVENTOR.
CLARENCE E. EDMAN
JOHN R. KELLY
WILLIAM J. MURPHY
LAWRENCE T. SKOLDS
BY *Anderson, Luedeka, Fitch, Even, Tabin* ATTORNEYS INVENTOR.
CLARENCE E. EDMAN
JOHN R. KELLY
WILLIAM J. MURPHY
LAWRENCE T. SKOLDS
ATTORNEYS

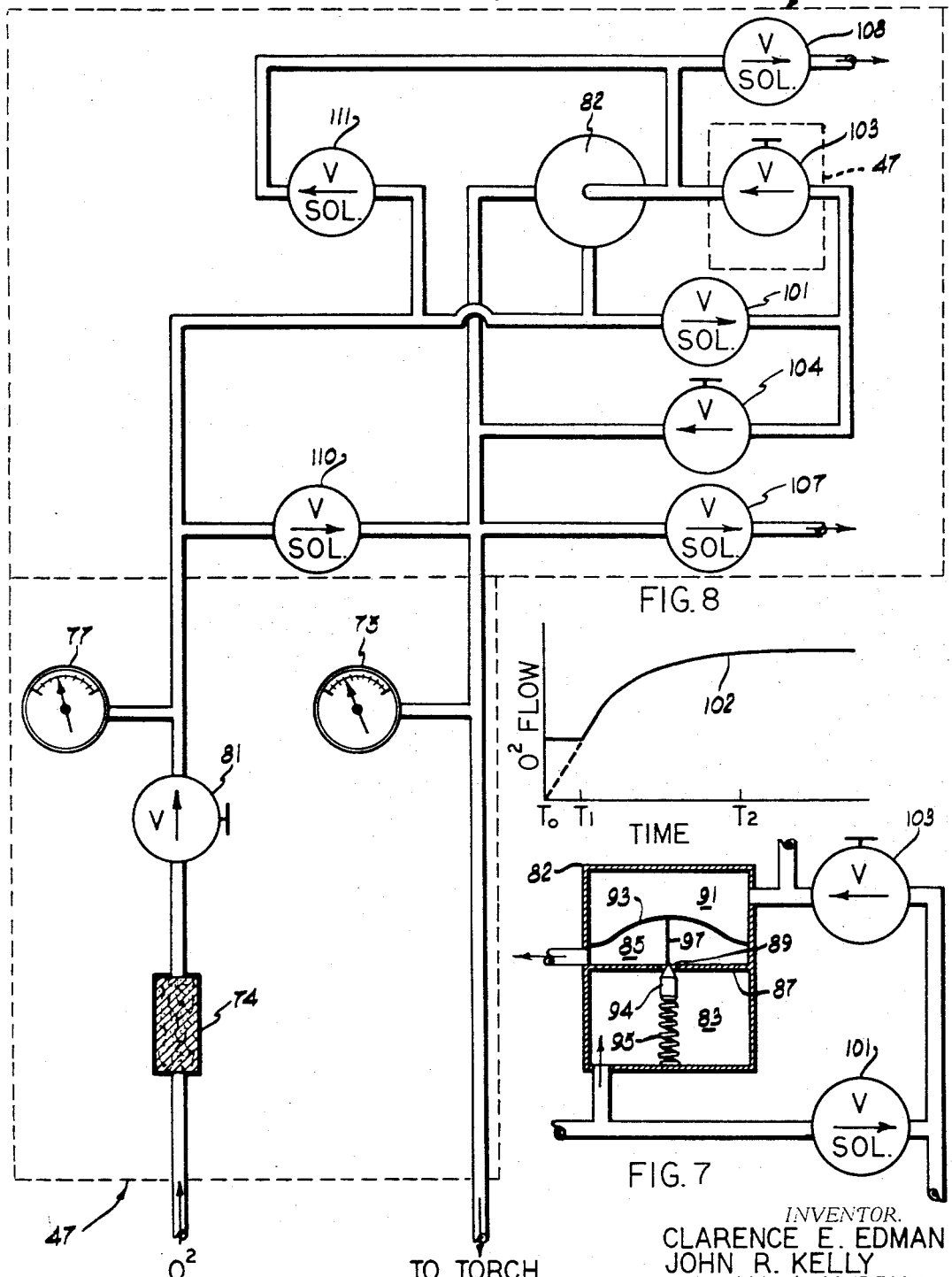

United States Patent Office 3,417,981
Patented Dec. 24, 1968

3,417,981
CONTROL SYSTEM FOR A FLAME CUTTING
MACHINE
Clarence E. Edman, Joliet, John R. Kelly, Park Ridge, William J. Murphy, Oak Park, and Lawrence T. Skolds, Joliet, Ill., assignors to Harris Calorific Sales Co., Chicago, Ill., a corporation of Illinois
Filed Apr. 7, 1966, Ser. No. 541,019
11 Claims. (Cl. 266—23)

ABSTRACT OF THE DISCLOSURE

A control system for a flame cutting machine automatically operates one or more cutting torches in various predetermined modes of operation wherein the flow of oxygen and fuel gas may be automatically regulated for preheating and cutting operations according to various controlled timing and sequencing functions.

---

This invention relates generally to a control system for use with a flame cutting machine and relates more particularly to a control system for use with a flame cutting machine wherein the cutting is accomplished by means of a pressurized stream of oxygen directed against the surface of the work material.

The embodiment illustrated is adapted for use with a flame cutting machine which includes one or more gas-fed torches usually mounted upon a horizontally disposed boom. The boom is positionable to permit movement of the torches along the desired cutting path. Work material is placed below the torches and after heating is exposed to a high pressure stream of oxygen which rapidly oxidizes the material forming a kerf therethrough. Due to the relatively complex operation of such machines, the employment of highly skilled personnel has heretofore been required. Even with the employment of such highly skilled personnel, the material waste resulting and the time required for the cutting operation has been relatively high. Further, as a result of the various manual settings and time sequences which must be observed, quality control of the product has been difficult to maintain.

A main object of the present invention is to provide a control system for a flame cutting machine. A still further object is to provide a control system which will minimize the waste of gas and other materials. Still another object is to provide a control system which will permit the employment of unskilled or semi-skilled operators, and further to permit a single operator to service several flame cutting machines. A still further object is to provide an apparatus which will permit increased operational speed and improved product quality control.

Other objects and advantages of the present invention will become apparent through reference to the following description and accompanying drawings which show an illustrative embodiment of this invention in which:

FIGURE 1 is a perspective view of a flame cutting machine provided with a control system in accordance with this invention;

FIGURE 2 is a perspective fragmentary view showing the action of the cutting torch of the machine illustrated in FIGURE 1 during one stage of its operation;

FIGURE 3 is a sectional view of the cutting torch illustrated in FIGURE 2 taken along line 3—3;

FIGURE 6 is a piping diagram of the cutting oxygen unit of the control system illustrated in FIGURE 1;

FIGURE 7 is a schematic illustration of a portion of the piping diagram of FIGURE 6;

FIGURE 8 is a graphical representation of the oxygen flow through the cutting oxygen control unit during one mode of operation.

Figure 4:
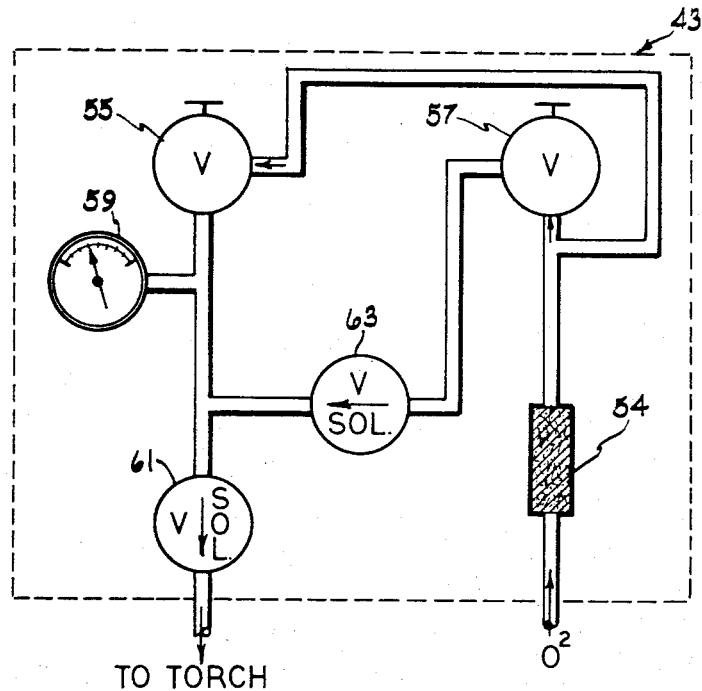
FIGURE 4 is a piping diagram of the preheat oxygen unit of the control system illustrated in FIGURE 1.

It will be of assistance in the understanding of this invention and appreciation of the advantages thereof to consider in detail a conventional flame cutting machine and its normal method of operation.

The cutting machine 11, illustrated in FIGURE 1, is supported upon a tracing table 13. Secured to the sides of the table 13 are guide rails 15 for guiding a pair of motor-driven carriages 17 therealong. Secured to the carriages 17 and supported thereby is a boom 19 with a line-tracing unit 21 mounted thereon. The tracing unit 21 is positioned above the table so that it may freely follow a cutting pattern. Upon the end of the boom 19, beyond the table, is supported one or more cutting torches 23. The boom 19 is positioned both longitudinally and transversely of the rails 15 by suitable motors 25 and 27, respectively, illustrated only in FIGURE 9. The motors 25 and 27 are controlled by the tracing unit 21 so that as the unit follows a pattern placed upon the table 13 the torches 23 are correspondingly positioned with respect to the work material.

In operation, tips 31 of the torches 23 are positioned above the surface of a piece of sheet steel or other work material 29 as illustrated in FIGURE 2. The work material 29 is initially heated by means of a high preheat flame obtained by igniting a mixture of fuel gas and oxygen discharged from a ring of openings 33 provided in the lowermost end of the torch, as illustrated in FIGURE 3. Due to the circular arrangement of the openings 33, the work material 29 is heated in the shape of a disc 35. It should be noted that the centralmost portion of the disc 35 is heated to a lesser degree, thereby forming a molten ring 36 at the periphery of the disc 35. Once the molten ring 36 is created, the tip 31 of the torch is quickly moved to align a central aperture 37 therein with a portion of the molten ring 36. Aperture 37 at the bottom of the tip 31 provides a port from which oxygen is discharged to the work material 29, and this is hereinafter generally termed the "cutting oxygen" which is utilized to perform the metal cutting operations, including the initial piercing operation when a cut is to be started from a point other than the edge of the work material. Once alignment has been obtained, the amount of cutting oxygen discharged from the aperture 37 is generally gradually increased until maximum oxygen flow is obtained for the particular job being worked. As the oxygen strikes the surface of the material 29, the molten material is oxidized to form a kerf. As previously mentioned, the flow of cutting oxygen discharged from the aperture 37 into the molten material is increased gradually from a minimum flow rate, since if the oxygen were initially, rapidly discharged, the blast of oxygen striking the molten material would cause the material to spray, resulting in possible damage to the tip 31 and in the depositing of bits of molten metal upon the surface of the work material 29. After maximum oxygen discharge is obtained, the preheat flame may be reduced and the torches 23 guided along the desired pattern by means of the control motors 25 and 27 (see FIGURE 9).

In the event the kerf is to be started from the edge of the material 29 rather than inwardly of the periphery as previously described, the edge of the material is first heated until molten, the oxygen may then be released abruptly from the aperture 37 and moved slowly into engagement with the molten edge of the material without excess splattering of the molten metal.

To obtain a satisfactory product, the rate of oxygen discharged from the aperture 37, the speed of movement of the tip 31, the width of the kerf and the thickness of the metal, as well as other lesser variables should be coordinated. For purposes of illustration, it will be assumed that a cutting machine utilizing propane gas as a fuel is to be used for cutting a sheet of steel two inches thick, and it will be further assumed that the kerf is to be started inwardly of the periphery of the material. The metal is heated by the preheat flame for approximately 10 seconds to melt the surface of the metal and once heated, the metal is exposed to cutting oxygen gradually discharged from the torch until a maximum rate of approximately 150 cubic feet per hour at approximately 80 pounds per square inch pressure is obtained. Once the kerf is started, the preheat flame is reduced and the cutting is undertaken at a rate of about 13 inches per minute. It will be appreciated that in the operation of a conventional flame cutting machine, the functions previously described are performed in sequence by a highly skilled operator who manipulates various controls upon a standard control panel 39. The operation is further complicated by the fact that the timing or sequencing must be varied to accommodate various materials.

A control system 41 in accordance with an embodiment of this invention is mounted above the conventional control panel 39 upon the boom 19, as illustrated in FIGURE 1. The control system 41 generally includes a preheat oxygen control unit 43 and a preheat fuel gas control unit 45 which, together, control the flow of oxygen and fuel gas to the torches 23 for maintaining the preheat flame. The control system further includes a cutting oxygen control unit 47 which co-operates with a pierce control unit 49 to control the flow of cutting oxygen to the torches 23. The pierce control is generally employed when the kerf is to be started within the periphery of the work material rather than at its edge. The preheat oxygen and fuel gas control units together with the cutting oxygen and pierce control units are sequentially actuated by electrical circuitry housed within a control cabinet 51. To permit remote operation of the control system 41, a remote control housing 53 is shown, for illustrative purposes, supported upon the table 13. As will be hereinafter more clearly described, the circuitry of the control cabinet 51 permits manual, manual-pierce and automatic-pierce operation of the control system 41, as selected by the operator.

Referring to the piping diagram of the preheat oxygen control unit 43 illustrated in FIGURE 4, oxygen is fed into the unit from a suitable supply source (not shown) through a filter 54 whereby impurities are removed from the oxygen. The low preheat flow of oxygen is controlled by a first manually adjustable regulator 55, and the high preheat flow by a second manually adjustable regulator 57 the inputs of both regulators being coupled to the output of the filter 54. A gauge 59 measures the pressure of oxygen discharged through the regulators 55 and 57. Low preheat oxygen is released from the unit to the torches 23 by actuation of a solenoid valve 61, and high preheat oxygen upon actuation of both the solenoid valve 61 and a solenoid valve 63. The valves 61 and 63, as well as other solenoid valves which will be subsequently described, are normally closed in their deenergized state.

To release the low preheat oxygen from the unit 43, the valve 61 is actuated, permitting the flow of oxygen through the filter 54 and the regulator 55 which is adjusted for the desired preheat oxygen flow rate. High preheat oxygen flow is obtained by actuation of both of the valves 61 and 63, thereby permitting oxygen to additionally flow through the regulator 57 to the torches 23.

Since the high preheat regulator 57 is normally open to a greater degree than the regulator 55, the pressure drop across the regulator 57 will be less than the pressure drop across the regulator 55. The back pressure across the regulator 55 caused by the flow through the regulator 57 will be relatively high, substantially cutting off the flow of oxygen therethrough. Thus, the high preheat oxygen flow is essentially dependent upon the setting of the regulator 57, whereas the low preheat flow is dependent upon the setting of the regulator 55.

Figure 5:
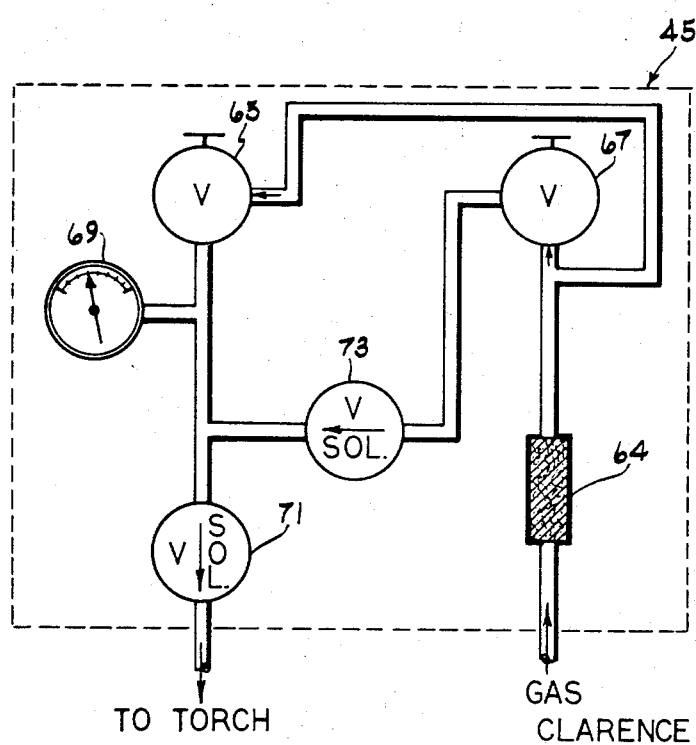
FIGURE 5 is a piping diagram of the preheat fuel gas unit of the control system illustrated in FIGURE 1.

Referring to the piping diagram of FIGURE 5, the fuel gas preheat control unit 45 receives fuel gas, which may, for example, be in the form of propane, natural gas or acetylene, through a filter 64 from a supply source (not shown). The low preheat gas flow is controlled by a manually adjustable regulator 65 and high preheat flow by a manually adjustable regulator 67. The unit is provided with a gauge 69. The unit 45 functions in a manner similar to the unit 43 previously described. Briefly, actuation of a solenoid valve 71 causes low preheat gas to flow from the unit 45, and actuation of a solenoid valve 73 simultaneously with the valve 71 results in an increased or high rate of flow to the torches 23.

The oxygen flow from the unit 43 is blended with the fuel gas from the unit 45 at the tip 31 of the torches 23. Thus, the regulators 55, 57, 65 and 67 are adjusted to obtain the desired high and low preheat flames. During periods when low preheat is desired, the solenoid valves 61 and 71 are actuated, causing a predetermined low flow of gas and oxygen to the torches, and during periods when high preheat is desired, the valves 63 and 73 are actuated simultaneously with the valves 61 and 71, providing an increased flow of gas and oxygen and therefore a more intense flame at the torches 23.

Referring to FIGURE 6, oxygen is supplied to the cutting oxygen control unit 47 and the pierce control unit 49 through a filter 74 from an oxygen source (not shown). The cutting oxygen control unit 47 includes outlet and inlet pressure gauges 75 and 77 respectively, and a manually adjustable regulator 81 which serves to control the flow of oxygen from the oxygen source to the pierce control unit 49.

One component of the pierce control unit 49 is a dome regulator 82 which is represented schematically in FIGURE 7. While dome regulators of various types are commercially available and readily known to those skilled in the art, for purposes of clarity and completeness, their operation will now be considered in some detail. The dome regulator 82 may be divided into three distinct cavities namely, an inlet cavity 83, an outlet cavity 85, and a dome cavity 91. The inlet cavity 83 is separated from outlet cavity 85 by a dividing wall 87 having an aperture 89 therethrough. The outlet cavity 85 is separated from the dome cavity 91 by a flexible diaphragm 93. The aperture 89 is selectively obstructed by a conically shaped plug 94 which is urged into seating position against the wall 87 by a coil spring 95. The plug 94 is counterbalanced by the resiliency of the diaphragm 93 to which it is connected by a support rod 97. Thus, as the diaphragm is deflected downwardly, as viewed in FIGURE 7, the plug 94 will be moved out of obstructing relation with the aperture 89. With the dome 91 at an equal or lesser pressure than the cavity 85, gas introduced into the inlet cavity 83 is prevented from passing to the outlet cavity 85 and out of the regulator 82 by the plug 94 which is seated in the aperture 89 and so maintained by the coil spring 95. Upon the release of pressurized gas into the dome, the pressure within the dome gradually increases resulting in an increased downward pressure upon the upper surface of the diaphragm 93, forcing the plug 94 out of obstructing relation with the aperture 89, and permitting gas to flow through the dome regulator 82. The diaphragm will deflect downwardly until the pressure differential across the diaphragm is counterbalanced by the tension of the spring 95. As the gas pressure builds up within the cavity 85, the obstruction afforded the aperture by the plug 94 will increase. Thus, at maximum dome pressure the plug 94 will "float" in a position permitting maximum oxygen flow through the regulator 82.

Oxygen is supplied directly to the inlet cavity 83 from the valve 81, and oxygen is further supplied to the dome thereof through a pierce solenoid valve 101 in series with a manually operable needle valve 103 which is physically located in unit 47. Thus, when the valve 101 is actuated, oxygen will flow into the dome at a rate determined by the setting of the needle valve 103 until maximum pressure is obtained within the dome.

To overcome the delay inherent in the regulator 82, it is desirable that a small amount of oxygen be passed through the output line before the pierce oxygen is released from the pierce control unit 49. For this reason a manually adjustable needle valve 104 is connected between the common connection of the valves 101 and 103 and the outlet of the regulator 82. The oxygen flow to the torches 23 upon actuation of the valve 101 will approximately follow the solid curve 102 illustrated in FIGURE 8. The horizontal portion of the solid curve 102 from $T_0$ to $T_1$ is determined by the setting of the valve 104, and the rising portion from $T_1$ to $T_2$ by the valve 103 and the dome regulator 82. The maximum gas flow through the regulator 82 is determined by the regulator 81. This mode of operation is referred to as the pierce mode of operation and, as hereinbefore indicated, is generally used when the kerf is to be started within the periphery of the work material.

To stop the flow of oxygen, valve 101 is deenergized. After oxygen flow to the torches is stopped, the pressure levels within the dome and outlet cavity are returned to atmospheric value so that the unit 49 will be ready for subsequent use. To vent the outlet cavity and dome of the regulator 82 to atmosphere, solenoid vent valves 107 and 108 are respectively connected to the outlet and the dome cavity of the regulator 82. To prevent the torch lines from filling with air when the vent valve 107 is opened, solenoid valves 109 are provided at the torches and are closed simultaneously with the closing of valve 101, the solenoid valves 109 being schematically shown in FIGURE 9.

During the manual mode of operation, which is usually used for starting the kerf from the edge of the work material, the regulator 82 is bypassed by a solenoid valve 110 permitting direct connection between the oxygen inlet line and outlet line to the torches 23. To prevent the creation of extreme pressure differentials across the regulator diaphragm in the manual mode of operation, thereby minimizing extreme diaphragm deflections and possible rupture, an equalization valve 111, which will be further discussed hereinafter, is connected between the dome and inlet cavity of the regulator 82. The piece control unit, preheat oxygen and preheat fuel gas units are controlled by electrical circuitry within the control cabinet 51.

Figure 9:
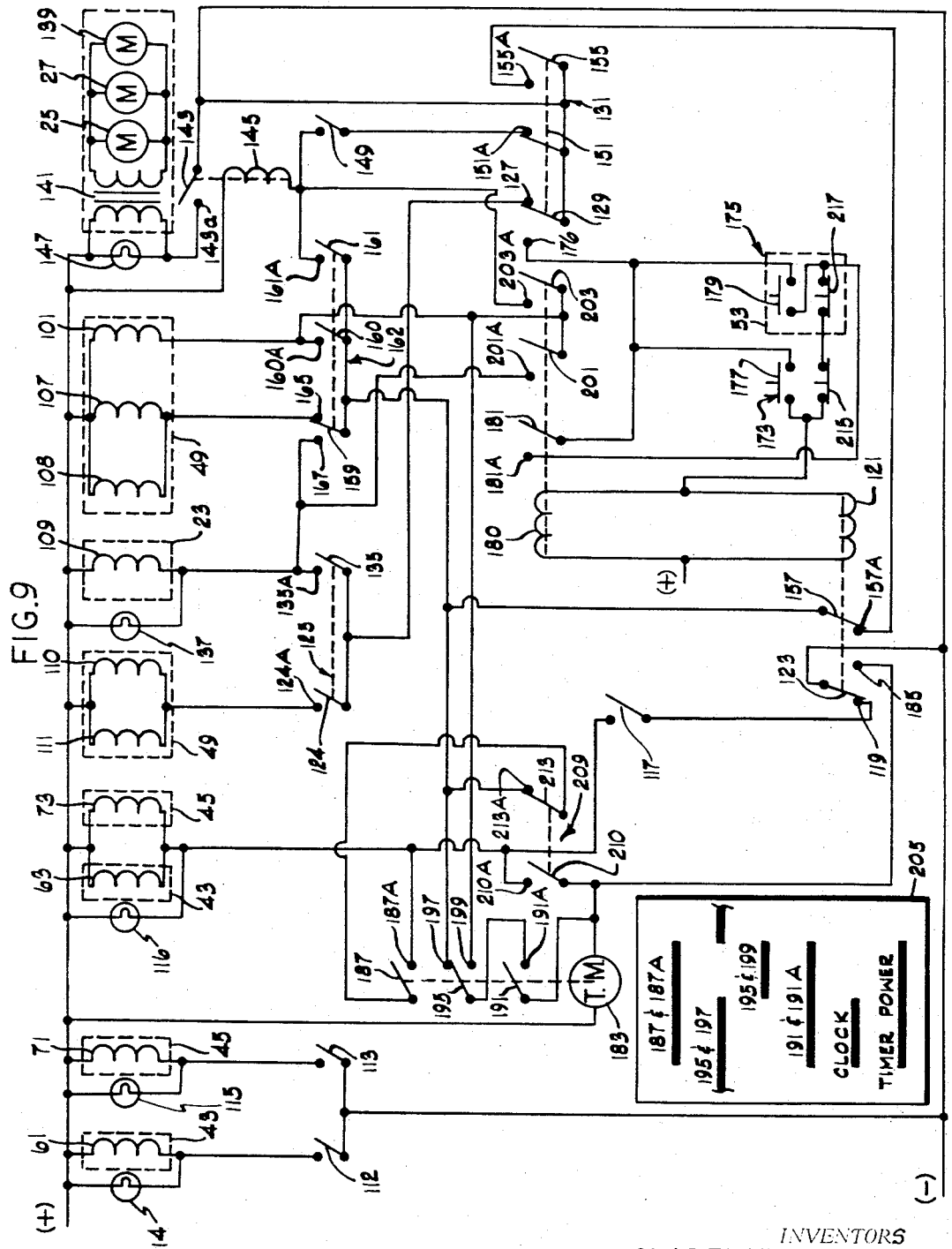
FIGURE 9 is an electrical schematic diagram of the control system.

An electrical schematic of the control circuitry housed within the control cabinet 51 is illustrated in FIGURE 9, and is designed to provide three modes of operation; namely, a manual mode, a manual-pierce mode, and an automatic-pierce mode. As previously mentioned, the manual mode is generally utilized when it is desired to start the kerf from the edge of the work material. In the manual mode, the low preheat solenoids 61 and 71 are energized by two SPST switches 112 and 113 respectively, which simultaneously light pilot lamps 114 and 115. The high preheat solenoid valves 63 and 73 and a pilot lamp 116 are actuated by means of a high preheat SPST switch 117 which is connected to contact 119 of relay 121 and to the negative side of the power line through the movable contact 123 in the position illustrated. The equalization valve 111 and the dome bypass valve 110 are actuated by means of contacts 124 and 124A of a DPDT switch 125. Movable contact 124 is connected through contacts 127 and 129 of 3PDT switch 131 to the negative side of the power source in the position illustrated. The torch solenoid valves 109 located upon the torches 23 are actuated by contacts 135 and 135A of the switch 125 which simultaneously lights a pilot lamp 137, and which is ganged to movable contact 124.

The motors 25 and 27 and a tracing motor 139 within the tracing unit 21 are connected to an isolation transformer 141 which is energized together with pilot lamp 147 through contacts 143 and 143A of a relay 145. The relay 145 is energized through a SPST switch 149 which is connected through contacts 151 and 151A of the switch 131 to the negative side of a power source. Thus, the preheat flame is controlled by switches 112, 113 and 117, and the cutting oxygen turned on by switch 125. Once the cutting oxygen is turned on, the preheat flame may be lowered by turning off switch 117 and cutting commenced by energizing the motors 25, 27 and 139 by means of switch 149.

The manual-pierce mode of operation is assumed by throwing the switch 131 to connect contacts 155 and 155A, thereby applying negative voltage through contacts 157 and 157A to the commonly connected movable contacts 159, 160 and 161, of a 3PDT switch 162. In the off position of switch 162, the vent solenoid valves 107 and 108 are energized through contacts 159 and 165.

In the manual-pierce mode of operation, the preheat flame is controlled in a manner similar to that previously discussed in connection with the manual mode of operation. To provide cutting oxygen to the torches 23, switch 162 is thrown, connecting the contact 159 to fixed contact 167 and thereby actuating the torch valves 109. Simultaneously, valve 101 is energized through contacts 160 and 160A, applying gas pressure to the dome of the regulator 82, and contacts 161 and 161A close energize relay 145 and the motors 25, 27 and 139.

Referring to FIGURES 2 and 8, at time $T_0$ switch 162 is thrown, the motors 25, 27 and 139 are energized and the torch tip 31 starts to move. The torch aperture 37 through which the cutting oxygen passes is positioned by the motors so that at time $T_1$ the aperture is above the molten ring 36. At this time, a gradually increasing stream of cutting oxygen is released into the hottest portion of the work material.

The control system is placed in the automatic-pierce mode of operation by throwing the switch 131 to provide power to push-button switches 173 and 175 through the movable contact 129 and fixed contact 176. The work material is positioned below the torches 23 and the low preheat switches 112 and 113 are thrown to provide low preheat gas to the torches. After the torches are lit, one of the buttons 177 or 179 of the switches 173 and 175 are depressed, supplying power to the relays 121 and 180. Upon release of the button, the relays are held in through latching contacts 181 and 181A of relay 180. Upon energization, relay 121 supplies power to a timer switch 183 through the relay contacts 123 and 185. Upon application of power to the timer switch 183, in a manner to be described below, contacts 187 and 187A as well as contacts 191 and 191A close, as illustrated in timing diagram 205. Power is thus supplied to the high preheat valves 63 and 73 providing an increased flow of oxygen and fuel gas to the torches 23. Power continues to be supplied to the vent valves 107 and 108 through contacts 195 and 197 and switch 162, thereby maintaining the vents open. The clock within the timer is set to the desired high preheat duration which generally ranges from 3 to 15 seconds. Upon expiration of this set period, contact 195 is connected to contact 199, de-energizing the preheat valves 63 and 73, energizing the torch valves 109 through contacts 201 and 201A of relay 180 and energizing the motor relay 145 through contacts 203 and 203A. Simultaneously, power is supplied to the pierce valve 101.

Referring to timing diagram 205, upon closing of the relay 121, power is applied to the timer switch 183 starting the timer clock therein and closing the timer contacts 187 and 187A, and 191 and 191A, as previously mentioned, thereby increasing the preheat gas to the torches and opening the vent valves 107 and 108. Upon expiration of the set preheat time, the timer clock stops and the relay contacts 195 and 197 are opened turning off the high preheat gas and closing the vents. Further, contacts 195 and 199 are connected turning on the pierce oxygen and opening the torch valves 109 to permit the flow of oxygen therethrough.

Referring to FIGURE 2, the motor speed and setting of the valve 103 are coordinated so that during the time period from $T_0$ to $T_1$ of FIGURE 8, the torch is moving toward the ring 36 or hottest portion of the molten disc 35. When the central opening 37 of the torch tip 31 is above the ring, the time $T_1$ has arrived and the oxygen starts to gradually increase, thereby starting the kerf. Thus, the cutting oxygen is increased gradually into the hottest portion of the work material. The gradual release of oxygen, as previously mentioned, greatly reduces splattering of the molten metal upon the start of the kerf. The motors 25 and 27, controlled by the unit 21, guide the torches 23 about the work material to cut the desired pattern. During cutting, should the operator note slag or scale upon the work material, such matter may be removed by the momentary application of the high preheat flame. The operator throws a preheat override DPDT switch 209, thereby connecting the preheat valves 63 and 73 to the negative side of the power line through switch contacts 210 and 210A and contacts 185 and 123 of relay 121. Further, connection to the vent valves 107 and 108 is broken by the contacts 123 and 123A to prevent vent actuation when the preheat override switch 209 is thrown. After the pattern has been cut, either button 215 or 217 of the switches 173 and 175 may be depressed, breaking current to the relays 121 and 180 to thereby turn off the control system 41.

In the manual mode of operation, a low preheat flame is obtained by throwing switches 112 and 113 and thereafter lighting the preheat gas. High preheat is manually obtained by throwing the switch 117, and after the desired time period, it is turned off and the cutting oxygen is turned on by means of the switch 125. The motors 25 and 27 for guiding the torches 23 are manually turned on by switch 149. In the manual-pierce mode, the preheat is controlled in a manner similar to that previously described, and the pierce oxygen and drive motors are turned on simultaneously by means of switch 162.

In the automatic-pierce mode of operation, the low preheat flame is controlled by the switches 112 and 113. The torches are positioned over the work material and either of the buttons 177 or 179 depressed. Upon depression of the button, the high preheat flame is obtained and maintained for a set period of time, after which it is automatically turned off, the pierce oxygen released and the drive motors actuated. When the torch tip is moved into position above the hottest portion of the work material, the pierce oxygen is increased thereby starting the kerf. Should it be desired to clean crust or other deposits from the material during the cutting operation, the preheat override switch 209 may be manually operated. Thus, a control system has been provided for a flame cutting machine which permits the selection of several alternative modes of operation.

Although but one specific embodiment of this invention has been shown and described, it will be understood that details of the construction shown may be altered without departing from the spirit of this invention as defined by the following claims:

We claim:
1. For use with a flame cutting machine including a cutting torch for maintaining a flame, said torch supplied with cutting gas from a supply source, a control system including first means for reducing the intensity of said torch flame, second means for gradually increasing the flow of cutting gas to said torch until maximum flow is reached, and timing means deactuating said first means after a set period of time and actuating said second means.

2. A control system in accordance with claim 1 including third drive means for positioning said torch, said third drive means actuated by said timing means concurrently with the actuation of said second means.

3. A control system in accordance with claim 1 including fourth means for selectively deactuating said first flame varying means so as to selectively permit increased flame intensity during actuation of said second gas flow control means.

4. A control system in accordance with claim 1 including fifth switch means for selectively turning on and off said torch flame and sixth switch means for selectively supplying instantaneous maximum cutting gas flow to said torch.

5. A control system in accordance with claim 1 wherein said first means comprises normally closed solenoid valves and said second means comprises a dome regulator and control means for controlling the rate of change of pressure within the dome of said dome regulator.

6. A control system for controlling the flow of gas to the cutting torch of a flame cutting machine comprising a timed switching means having a first timed condition and a second non-timed condition obtained upon the expiration of said first condition and maintained as long as electrical power is supplied to said switching means, preheat valves controlling the supply of oxygen and fuel gas to said torch for maintaining a preheat flame, said preheat valves actuated by said timed switching means when in said first condition, cutting oxygen valve means for controlling the supply of cutting oxygen to said torch, said cutting oxygen valve means actuated by said timed switching means when in said second condition, and drive means for moving said torch actuated by said timed switching means when in said second condition.

7. A control system in accordance with claim 6 wherein said preheat valves are in the form of normally closed solenoid valves, when said switching means is in said first condition said solenoid valves are actuated, thereby increasing the intensity of said preheat flame, said control system including a dome regulator for controlling the flow of cutting oxygen to said torch, said cutting oxygen valve means controlling the pressure within the dome of said regulator, thereby controlling the flow of cutting oxygen to said torch, said cutting oxygen valve means including an adjustable needle valve in series connection with a normally closed solenoid valve so that when said solenoid valve is energized the gas pressure within said dome will gradually increase resulting in a gradually increasing flow of cutting oxygen to said torch until a maximum flow rate is obtained.

8. A control system in accordance with claim 7 including valve means actuated by said switching means permitting a predetermined minimum flow of oxygen to said torch when said swtiching means is in said second condition so that the flow of cutting oxygen to said torch will be maintained at a minimum value during the initial period of increase in dome pressure, and vent valves connected to the inlet and the dome of said regulator, said vent valves being actuated by said switching means when in said first condition to permit selective depressurization of said regulator.

9. In co-operation with a flame cutting machine including a torch receiving preheat gas from a supply source and having first means for controlling the intensity of the preheat flame at said torch, said torch receiving cutting oxygen from an oxygen supply source and having second means for controlling the flow of cutting oxygen to said torch, said first and second means having a relative predetermined sequence of operation, a control system for controlling the operation of said means to provide manual, manual-pierce and automatic-pierce modes of operation, said control system comprising an electrically operable preheat valve forming a portion of said first means whereby upon actuation of said preheat valve a predetermined intensity heating flame will be provided at said torch and upon deactuation of said preheat valve a reduced flame will be provided, first and second electrically operable cutting oxygen valves forming a portion of said second means, said first valve providing upon actuation a fixed continuous predetermined rate of cutting oxygen flow to said torch and said second valve providing upon actuation a gradually increasing flow of oxygen to said torch until a predetermined flow rate is reached after which a fixed predetermined flow rate is provided, manual switching means for selective energization of said preheat valve and manual switching means for actuation of said first cutting oxygen valve, the sequential operation of said manual switching means providing said manual mode of operation and manual switching means for actuation of said second cutting oxygen valve to provide gradually increasing oxygen flow to said torch, said manual preheat valve switching means and said second cutting oxygen valve switching means being sequentially operated to provide said manual-pierce mode of operation, and manually operable timed switching means for actuating said high preheat valve for a predetermined period of time and upon expiration of such period deactuating said high preheat valve and simultaneously actuating said second cutting oxygen valve, thereby providing said automatic-pierce mode of operation.

10. A control system in accordance with claim 9 including motor means for guiding said cutting torch along its desired path, said motor means actuated by a manual switching means when said control system is operated in said manual mode of operation, said motor means being further actuated by said manual swtching means for said second cutting oxygen valve when said control system is operated in said manual pierce mode of operation and said motor means being further actuated by said time switching means upon expiration of its timed period simultaneously with the actuation of said second cutting oxygen valve when said control system is operated in said automatic-pierce mode of operation.

11. For use in cooperation with a flame cutting machine including a cutting torch supplied from a supply source, a control unit comprising a dome regulator, the inlet of which is connected to said supply source and the outlet of which is connecetd to said cutting torch, a first valve means connected to said supply source and the dome of said dome regulator, said first valve means governing the rate of change of pressure within the dome of said dome regulator to thereby control the flow of gas through said regulator to said cutting torch, said first valve means including a first manually adjustable valve in series connection with an electrically operable valve, a second valve means having an inlet which is connected to the junction between said first manual valve and said elevtrically operable valve so that when said electrically operable valve is actuated, fluid will flow through said second valve means to said torch at a constant rate and gas pressure within said dome will gradually increase at a rate determined by the setting of said first manual valve so that gas flow through said regulator will increase gradually until a maximum value has been obtained which is greater than the flow of gas through said second valve means, a first vent valve connected to the dome of said regulator for venting the dome to atmosphere, and a second vent valve connected to the outlet of said dome regulator for venting the inlet cavity thereof to the atmosphere so that said dome regulator may be selectively returned to its initial depressurized state.

References Cited
UNITED STATES PATENTS

| | | | |
|---|---|---|---|
| 2,533,729 | 12/1950 | Geffroy | 158—27.4 |
| 2,654,995 | 10/1953 | Ostoff | 137—599 X |
| 2,935,312 | 5/1960 | Kilpatrick et al. | 266—23 |
| 3,009,479 | 11/1961 | Flanders et al. | 137—599 X |
| 3,135,282 | 6/1964 | Gray | 137—599 X |
| 3,180,396 | 4/1965 | Eichelman et al. | 266—23 |

WILLIAM J. STEPHENSON, *Primary Examiner.*

ENGENE MAR, *Assistant Examiner.*

U.S. Cl. X.R.

137—599; 158—27.4